Oct. 28, 1958  L. H. NIEMS  2,858,123
APPARATUS FOR COOLING AND CALCINING
Filed Feb. 9, 1955  2 Sheets-Sheet 1

Inventor
LEE H. NIEMS

Inventor
LEE H. NIEMS

United States Patent Office 2,858,123
Patented Oct. 28, 1958

2,858,123

APPARATUS FOR COOLING AND CALCINING

Lee H. Niems, Homewood, Ill., assignor to Marblehead Lime Company, Chicago, Ill., a corporation of Delaware Application February 9, 1955, Serial No. 487,117

3 Claims. (Cl. 263—32)

The present invention is directed to an improved apparatus for the heat treatment and cooling of calcareous material, and in particular relates to an improved apparatus for calcining and cooling lime particles.

Naturally occurring limestone rocks are frequently calcined to convert the calcium carbonate in the limestone to substantially pure calcium oxide in a rotary, inclined kiln with the use of a direct flame as the source of heat. When the kiln is rotated, however, the smaller sizes tend to accumulate towards the center of the load in the kiln where they are not subject to direct radiation from the flame, nor are they in contact with hot lining of the kiln. Because of their location, these small pieces at the center frequently are not completely calcined, so that they retain a limestone core.

Attempts to make the calcination treatment more thorough by keeping the particles in the furnace for a longer time, or by increasing the temperature do not always function satisfactorily because increasing the severity of the treatment frequently results in overburning already calcined particles, causing a discoloration and other effects which are completely undesirable in the product, as well as an increase in the fuel requirements.

The present invention is directed to an apparatus for completing the calcining of lime particles as they leave the rotary kiln, followed by cooling the particles in an efficient manner to a temperature at which the particles can be handled.

The chemical process involved in the calcination of calcium carbonate is represented by the following equation:

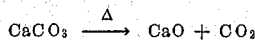

In accordance with the present invention, the concentration of carbon dioxide produced in completing the calcining reaction is continuously removed, at least in part, so that the calcining reaction proceeds more nearly to completion.

In the apparatus of the present invention a soaking zone is combined with a cooling zone in such a manner that the air flow through the cooling zone is used more efficiently. Specifically, in the apparatus of the present invention, the material leaving the rotary kiln drops directly into a soaking zone where any incompletely calcinated lime particles remain until such time as the calcination is completed by the transfer of the sensible heat from the lime particles themselves. The calcined particles are discharged as a plurality of separate streams into a cooling zone where the particles are contacted with a countercurrent stream or streams of air.

In order to avoid decreasing the temperature in the soaking zone below that required for efficient calcination, most of the air leaving the cooling zone is diverted around the soaking zone but recovered, for its sensible heat, and put to other uses. However, a portion of the air being passed through the cooling zone is directed upwardly through the soaking zone so as to purge the soaking zone of some of its carbon dioxide content, thereby causing the calcining treatment going on in the soaking zone to go in the direction of completion.

Experiments have indicated that where the carbon dioxide content of the soaking zone atmosphere is maintained at a level lower than that which would naturally occur without purging, calcination of the particles takes place at lower temperatures. Consequently, a greater average temperature differential exists between the hot lime particles and the uncalcined core of the particles. Since there is a greater temperature differential, a greater amount of heat transfer to the core will take place, and at a greater rate, thereby completing the calcining more rapidly.

An object of the present invention is to provide an improved apparatus for calcining of calcareous material, particularly limestone.

Another object of the invention is to provide an improved apparatus including a combined soaking and cooling zone which cooperate to achieve efficient calcining as well as efficient heat transfer in the cooling zone.

Another object of the invention is to provide an improved apparatus for by-passing cooling air about a soaking zone, while permitting a small fraction of the cooling air to serve the function of purging the cooling zone of some of its carbon dioxide content.

These and other objects and features of the invention will be more apparent to those skilled in the art from the following description of the attached sheets of drawings which illustrate preferred embodiments of the invention.

Figure 1:
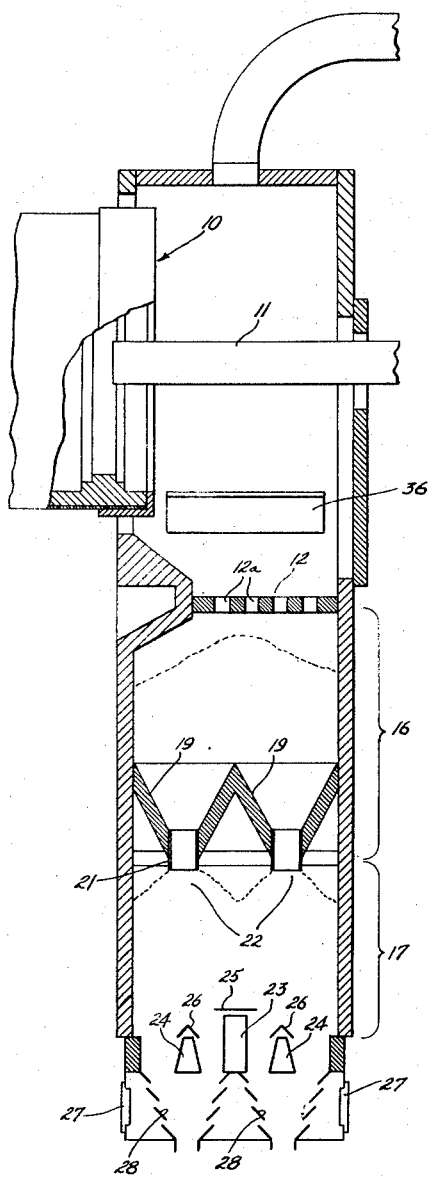
Figure 1 is a front elevational view of the apparatus which can be employed in the present invention.

Figure 1, reference numeral 10 indicates generally a rotary kiln of the type employed to calcine limestone particles, the kiln 10 receiving one or more burners at the discharge end. The burners 11 are positioned to direct streams of flame from the combustion of powdered coal, oil, or the like into the kiln 10.

The kiln 10 is suitably inclined so that the calcined and partially calcined particles leaving the kiln 10 fall by gravity onto a grate 12 having perforations 12a which permit all the lime particles to pass through, but retain any large pieces of ash ring or coating which may pass from the kiln.

Figure 2:
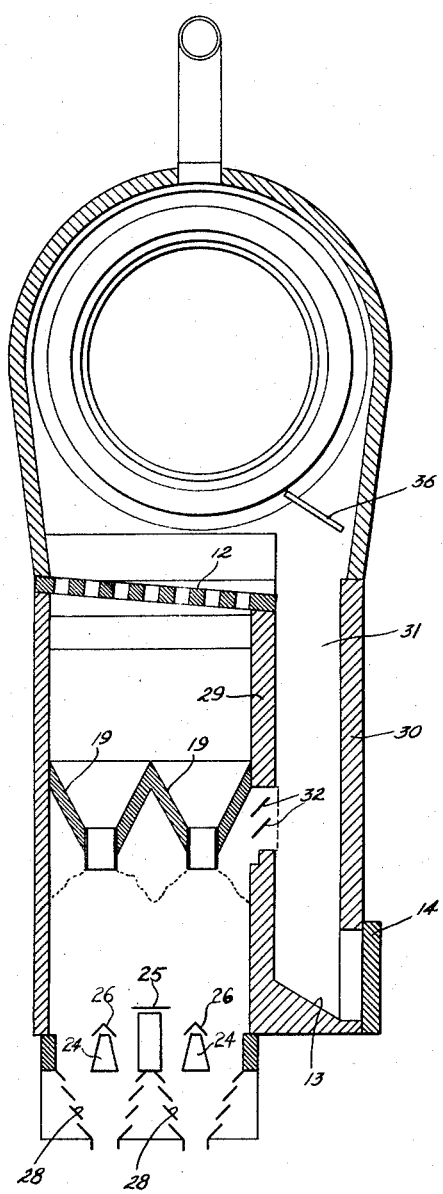
Figure 2 is a side elevational view of the apparatus.
Figure 3:
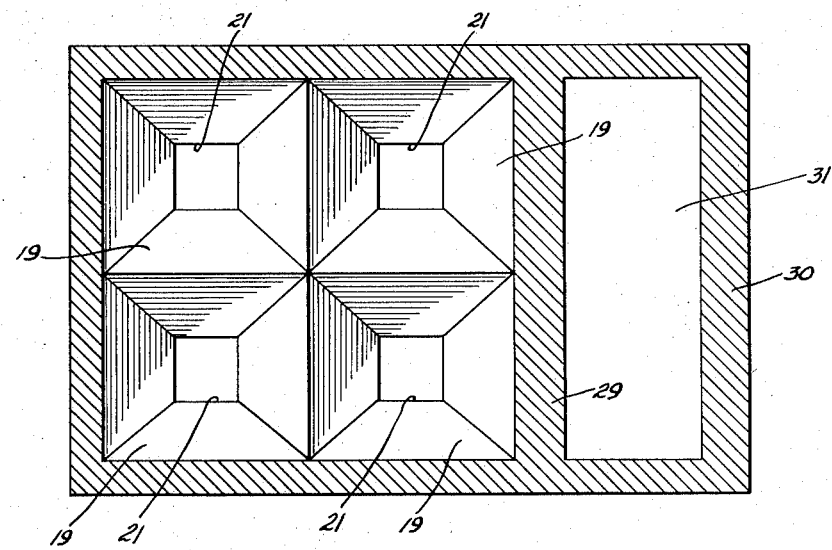
Figure 3 is a cross-sectional plan view of the embodiment of the invention illustrated in the preceding two figures.

As best seen in Figure 2, the grate 12 is inclined to the horizontal so that the larger particles accumulating on the grate may roll off by gravity or may be raked off into a discharge chute 13 from which the larger particles may be removed periodically by opening an access door 14 provided for that purpose.

Particles of lime pass through the holes 12a and pass into a soaking zone generally indicated at numeral 16 in the drawings. In the zone 16, the particles are unheated, but calcination of any uncalcined fraction is continued by the heat contained in the sensible heat of the particles.

In passing the calcined particles from the soaking zone to the cooling zone, it is desirable to avoid as much as possible the formation of a central cone of material due to the natural settling effects of the lime particles. If particles of this type are permitted to settle naturally, it will be found that a self-classifying effect occurs in which the finer particles segregate toward the center of the cone, and the coarser particles tend to segregate toward the edges. Since the smaller, more closely packed particles in the center of the cone present the greatest resistance to air flow, attempts to cool this mass by passing air upwardly through it frequently result in channeling the air toward the edges of the mass, leaving the center portion substantially uncooled. Coupled with the greater resistance to air flow through the central portion is what is known as the "wall effect" arising from the fact that the particles located directly along the walls of the chamber are not as closely interpacked as the rest of the bed. Consequently, a smaller flow resistance occurs along the wall, and higher air flows occur at the path of least resistance presented at the boundary between the particles and the wall. The cumulative result of all these factors is rapid cooling of the particles toward the edge of the built-up cone, and insufficient cooling at the center where the finer particles are located.

To minimize the effects of this type of distribution, the particles leaving the soaking zone 16 are transferred into a plurality of individual streams into a cooling zone generally indicated at numeral 17 in the drawings. The discharge means employed for discharging particles from the soaking zone 16 into the cooling zone 17 may take the form of a plurality of hoppers 19 each consisting of a frusto-pyrimidical section terminating at its smaller end in a restricted throat 21.

The particles entering the cooling zone 17 therefore are separated into four distinct streams substantially equal in area. Some self-classifying may occur within the cooling zone 17 itself, resulting in the production of conically shaped peaks 22 on the bed of material settling in the cooling zone 17, but the problems of heat transfer will not nearly be as great as if the mass were allowed to settle into a single conically shaped bed. It will be found that the fines passing from the soaking zone 16 will be more or less equally distributed in each of the four streams by entering the cooling zone 17.

To provide the cooling effect desired, the cooling zone 17 is provided with a plurality of air inlet means which may include a centrally disposed air inlet 23 in combination with a plurality of secondary air inlet means 24 at spaced intervals about the central conduit 23. For most efficient cooling, the secondary air inlet means 24 should be located in line with each of the hoppers 19 as they discharge their streams of material into the cooling zone 17. A baffle 25 is provided over the central conduit 23, and baffles 26 are provided over the secondary air inlets in order to diffuse the air as it enters the cooling zone and to prevent accumulation of the particles within the conduits themselves. The introduction of air centrally of the discharge zone also is effective in preventing a down-draw of material through the center of the hopper.

The air supply for the cooling zone is received through one or more air inlets 27 located below the cooling zone proper, and fed from a source of pressured air. A plurality of baffled hoppers 28 receive the particles falling by gravity from the bed in the cooling zone and transfer them to suitable feeding or other handling equipment.

In order to permit efficient soaking of the particles in the soaking zone 16, without the addition of extraneous heat, most of the air passing through the cooling zone 17 should be by-passed about the soaking zone 16. For this purpose, the throats 21 are made with relatively small cross-sections and of extended length so that there is a high resistance flow path to the soaking zone, and the cooling and soaking zones are provided with an end wall 29 which is spaced a substantial distance from the outer wall 30 of the unit. The space between the walls 29 and 30, identified at numeral 31 in the drawings, thereby provides a by-pass duct of substantial area for handling the large quantities of air which must be effectively removed from the cooling zone. This construction also eliminates the possibility of dust accumulation in the spaces adjoining the soaking and cooling zones. The large open area at the surface of the bed also insures low air exit velocities from the bed and thus minimizes dust pickup.

As previously explained, it is desirable to increase the efficiency of the calcining operation in the soaking zone 16 by passing some of the cooling air through the soaking zone as a purging gas. For this purpose, a plurality of baffles 32 are disposed between the cooling zone 17 and the duct 31 to regulate and proportion the amount of air being sent into the duct 31 and that being sent into the soaking zone 16. The correct proportion of air to be by-passed can be readily determined through experience. The carbon dioxide content in the soaking zone and the pressure at the top of the cooling zone will be the determining factors in making this adjustment. An adjustable baffle 36 is provided to prevent the tangential current of air from creating a swirling action in the flame firing the kiln 10.

Generally, the by-pass duct 31 must handle about 95% of the total cooler air so that the air being used to purge the soaking zone is about 5% of that going through the cooling zone. A duct of the type described which has a large open area at the top of the cooling zone, and a large, easily cleaned duct can effectively by-pass sufficient air to provide the desired cooling and purging effect. Attempts to accomplish the same effect with pipes or other conduits extending between the cooling zone and the soaking zone have not been successful because of excessive dust pick-up and excessive flow resistance, so that the proper proportioning of the cooling air has not been achieved.

Figure 4:
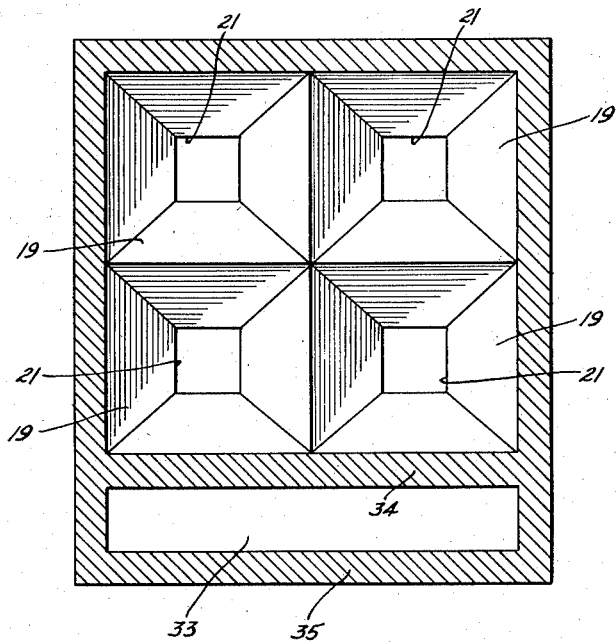
Figure 4 is a cross-sectional plan view of a modified form of the invention.

A modified form of the present invention is illustrated in Figure 4 of the drawings. In this form of the invention, a duct 33 is provided between a forward wall 34 and an outer wall 35, the duct 33 being of sufficient cross-sectional area to handle the required volume of air. The advantage of this arrangement is the fact that the air passes to the hood and kiln in a direct axial path, rather than in a tangential path, so that the flame of the kiln is less likely to be affected by the air stream.

The apparatus of the present invention provides an efficient but economical means for controlling the distribution of air between a combined soaking and cooling zone. The cooling takes place without substantial interference with the calcining operation, and the sensible heat in the air passing through the cooling zone can be readily recovered. Likewise, the soaking operation is carried out without interference from high velocity air streams, but with sufficient air being present to move the calcining reaction toward completion, to provide a lower carbon dioxide content in the soaking zone, to increase the heat transfer rate, and to increase the total heat available for calcination.

It will be evident that various modifications can be made to the described embodiments without departing from the scope of the present invention.

I claim as my invention:

1. An apparatus for heat treating calcareous particles comprising spaced walls defining a soaking zone and a cooling zone, a plurality of angular hoppers disposed between said soaking zone and said cooling zone, said hoppers having reduced throat portions arranged to confine the flow of particles from said soaking zone into said cooling zone into separate streams providing relatively high resistance paths for air flow from said cooling zone into said soaking zone, means for introducing air into said cooling zone, and wall means spaced from said spaced walls providing with said spaced walls a passageway in open fluid communication with said cooling zone having a relatively low resistance to air flow from said cooling zone.

2. The apparatus of claim 1 including damper means arranged to regulate the amount of air passing into said passageway.

3. The apparatus of claim 1 in which said passageway is substantially coextensive in length with the combined length of said soaking and cooling zones.

References Cited in the file of this patent

UNITED STATES PATENTS

| | | |
|---|---|---|
| 2,137,158 | Douglass | Nov. 15, 1938 |
| 2,653,809 | Azbe | Sept. 29, 1953 |